(12) United States Patent
Thompson

(10) Patent No.: US 6,357,966 B1
(45) Date of Patent: Mar. 19, 2002

(54) BALLASTING METHOD AND APPARATUS FOR THE INSTALLATION OF SYNTHETIC UNDERWATER PIPELINES

(76) Inventor: Allister Wade Thompson, #704-1020 Harwood St., Van (CA), V6E4R1

( * ) Notice: Subject to any disclaimer, the term of this patent is extended or adjusted under 35 U.S.C. 154(b) by 0 days.

(21) Appl. No.: 09/618,467

(22) Filed: Jul. 18, 2000

(51) Int. Cl.[7] .................................................. F16L 1/12
(52) U.S. Cl. ..................... 405/171; 405/158; 138/30; 138/31
(58) Field of Search ............................. 405/171, 172, 405/158, 170; 138/30, 31

(56) References Cited

U.S. PATENT DOCUMENTS

| | | | |
|---|---|---|---|
| 3,174,505 A | * | 3/1965 | Bauer |
| 3,467,013 A | * | 9/1969 | Conner |
| 3,946,760 A | * | 3/1976 | Murakami et al. |
| 4,052,862 A | * | 10/1977 | Lamy |
| 4,062,198 A | * | 12/1977 | Lamy |
| 4,120,168 A | * | 10/1978 | Lamy |
| 4,498,811 A | * | 2/1985 | Fern et al. |
| 5,425,599 A | * | 6/1995 | Hall et al. |
| 5,795,102 A | * | 8/1998 | Corbishley |
| 6,267,147 B1 | * | 7/2001 | Rago |

* cited by examiner

Primary Examiner—David Bagnell
Assistant Examiner—Katherine Mitchell

(57) ABSTRACT

This invention relates to a method and apparatus for installing underwater synthetic pipelines whereas the pipeline has single or multiple ballast tubes, attached to the pipeline through the use of a band or fabric strap to contain the pipeline components in a fixed bundle, around specifically shaped primary ballast weights designed to impart the minimal amount of ballast weight necessary for sinking the pipeline to the sea bed. The pipeline and all of its parts are corrosion-resistant, and has the ballast weight reduced to the minimum required during launching and sinking phases. The final ballast weight is achieved after the pipeline has been positioned on the sea bed by filling the ballast tubes, attached to the pipeline, by injection or other means, with a mixture consisting of a substance which possesses a relative density that is greater than water. The invention also makes provisions for any ratio of final ballast weight to be applied to the pipeline, while still retaining the benefits of low weight during the launching and sinking. The invention makes further provisions to allow an increase or decrease of the amount of ballast weight applied, to specific sections, along the length of the pipeline. The invention also allows the pipeline to retain a specific orientation, relative to the sea bed, during the installation. The invention is particularly well suited for pipelines manufactured from synthetic materials, but may also be applied to pipelines manufactured from metal or other compounds.

20 Claims, 13 Drawing Sheets

BALLASTING METHOD AND APPARATUS FOR THE INSTALLATION OF SYNTHETIC UNDERWATER PIPELINES

BACKGROUND OF THE INVENTION

Many pipelines installed underwater are manufactured from synthetic materials, such as high-density polyethylene (HDPE) because of the superior corrosion resistance, and in certain applications, the superior wear resistance of synthetics over iron alloys. Synthetic pipelines are used in a wide variety of tasks for both industrial and municipal applications. As the depths of the installations and the lengths of the synthetic pipelines are increasing, better methods of installations must be developed.

Unlike pipelines manufactured from iron alloys, pipelines manufactured from synthetic materials do not possess the high tensile and compressive strengths associated with iron alloys. Unlike pipelines manufactured from iron alloys, synthetic pipelines possess a relative density which is close to, or less than, that of water. HDPE for example, has a relative density which is less than water, and consequently will float when placed in water. Because the relative density of synthetics is close to that of water they require that large amounts of additional weight, in the form of ballast, be attached to these pipelines to allow them to sink below the surface and to anchor them firmly upon the sea bed. Ballast weight that is attached prior to the installation of the pipeline is the most common type of ballast weighting. Often this ballast weighting consists of pre-cast concrete blocks attached to the pipeline with bolts, through openings preformed in the concrete blocks for this purpose.

There are specific problems encountered when installing underwater pipelines, arising from the relationship of the net submerged weight of the pipeline, that is the sum total weight of all of the components making up the pipeline, and the material strength of the pipeline itself This problem is compounded for pipelines produced from synthetic materials, as the lack of tensile and compressive strength of synthetic materials can make these pipelines prone to buckling from the forces exerted by the net submerged weight during the sinking process. While this invention aims to enhance the ease of installing synthetic pipelines it may also be applied to pipelines manufactured from metal or other compounds.

The amount of ballast weight attached to pipelines varies with the design of the pipeline and such factors as sub sea terrain, ocean currents, wave action and the type of product or substance the pipeline is designed to carry. A pipeline designed to carry a gas, will require a greater amount of ballast weight than a pipeline designed to carry products such as slurry, which has a relative density greater than water. Strong littoral currents or wave induced forces may also dictate that additional ballast weighting be applied to securely anchor the pipeline in specific sections. The amount of ballast weighting installed on the pipeline may not be distributed equally as a function of its length, as the forces of waves or current acting upon the pipeline may vary depending upon such factors as the variations of the depth and the length of the pipeline. Wave induced forces, acting on the pipeline, will generally decrease as the depth of water increases. Littoral currents, acting on the pipeline, will generally increase as the distance from shore becomes greater. Variations of the pipeline elevation due to the sub sea terrain, on which it is laid, may also dictate that ballast weighting of specific sections must also be increased or decreased for a specific section.

The ballast weighting of pipelines forms a significant portion of the total economic value of the pipeline. The amount of ballast weighting influences the method of launching the pipeline from its point of construction as well as the method of sinking the pipeline to the sea bed, both of which can be translated into economic costs.

The amount of weight added as ballast to a pipeline is commonly referred to as the offset weighting and is expressed as a ratio of the amount of ballast weight required to offset the buoyant force of a pipeline assumed to be partially or totally filled with air at atmospheric pressure. As an example, an offset weight requirement of 50% means that the ballast weight added to the pipeline negates the buoyant force of the pipeline if it were filled to 50% capacity with air. As another example, an offset weight requirement of 100% would mean that the ballast weight added to the pipeline would negate the buoyant force of the pipe if it were possible to fill the pipeline with air to 110% of it's volume. Filling a pipeline to 110% of its volume is not possible although the practice of expressing the weight requirement in this way gives an exact indication of the amount of ballast weight required in relation to the size of the pipeline.

Offset weight requirements in excess of 95% will generally require that auxiliary buoyancy, in the form of floats, vessels etc., be temporarily attached to the pipeline, to allow it to float upon the body of water prior to its placement on the bed of the body of water. In lieu of using auxiliary buoyancy the pipeline designer may elect to remove some of the ballast weight, prior to the pipeline installation, and install the deleted ballast weight after installation.

As previously mentioned, it is beneficial to the design of pipelines to vary the amounts of ballast weight applied to specific sections of the pipeline. These sections may be identified as a section of the pipeline located from a specific datum or reference point. This variation of ballast weight, on these sections of the pipeline, can increase or decrease. As an example of changing ballast weighting, a hypothetical pipeline of 10,000 feet in length terminating at a depth of 500 feet, which is built to discharge a municipal or industrial effluent into an ocean or other body of water, may start at the shore with a 300% offset weighting to counter strong wave induced forces. After acquiring a distance of 1,000 feet from the shore and a depth of 75 feet the offset weight may be reduced to 110%. At 3,000 feet from the shore the pipeline depth is 200 feet and the offset weight may be further reduced to 100%. A change in pipeline elevation, necessitated because of a rise in the sea bed starting at 5,000 feet from the shore, which now exposes the pipeline to littoral or wave induced currents, may now require the offset weight to be increased to 150% for a 1,500 foot section of the pipeline. The remainder of the pipeline, after the 1500 foot section over the rise in sea bed elevation, may now have the offset weight reduced to 100% for the remaining 3,500 feet.

The invention allows the designers and installers of pipelines the ability to change the offset ballast weight of any section of the pipeline as dictated by ocean currents or sub sea terrain. This change in ballast weight is accomplished by increasing or decreasing the diameter of the ballast tubes in the specific area in question.

It is common practice for installers of pipelines, such as those manufactured from HDPE, to construct the pipeline on land, adjacent to the edge of the body of water where it is to be installed, complete with all of its attached ballast weights and if required, for pipelines with offset weight designed at or exceeding 100%, auxiliary buoyancy vessels. Depending upon the total length and size of the pipeline as well as the amount of ballast weight attached, it is possible to launch the complete hermetically sealed pipeline into the water to float upon its own inherent buoyancy or the combination of its own buoyancy supplemented by the auxiliary buoyancy vessels.

It is often not practical to launch pipelines of great size and length in one piece, because of the sheer bulk of the total aggregate weight of the pipeline and its components, and installers of such pipelines may choose to fabricate the pipeline in shorter more easily managed sections. The shorter sections are subsequently launched individually and can be joined together from a barge equipped for this purpose or the sections can be joined together as they enter the water one behind the other. Regardless of the method of launching the pipeline, the same basic principles apply, that is, to position the floating hermetically sealed pipeline over top of the chosen underwater pipeline corridor, and then to remove or otherwise delete the buoyancy factor to allow the pipeline to sink to the sea bed.

As previously mentioned, offset weight requirements in excess of 100% will generally require that additional buoyancy, commonly referred to as auxiliary buoyancy, in the form of vessels, floats etc., be temporarily attached to the pipeline. While laying the pipeline onto the sea bed, the auxiliary buoyancy vessels are flooded or otherwise removed from the pipeline. Auxiliary buoyancy vessels generally are designed to be filled with air and therefore must meet the structural requirements for pressure vessels due to the pressures at depth that they will be exposed to. Auxiliary buoyancy vessels may not be practical for pipelines laid at great depths because of the significant expense to manufacture them. As previously mentioned, an alternative to attaching auxiliary buoyancy is to delete some of the ballast weight from the pipeline prior to installation. The ballast weight deleted is installed after the placement of the pipeline on the sea bed. This can be accomplished by lowering the ballast weights from the water surface and placing the ballast weights on the pipeline with the use of divers or remotely operated vehicles. This method can become economically impractical, depending upon the length of the pipeline and the depth of the area requiring post ballasting.

"S" bend sinking is a commonly employed method of positioning synthetic pipelines, complete with ballast weighting attached, to the sea bed. "S" bend sinking is accomplished by introducing water at one end of a floating pipeline while simultaneously venting air from the opposite end. As the water is introduced the pipeline loses its inherent buoyancy and the end of the pipeline, where the water is being introduced, sinks to the sea bed. The remainder of the pipeline is floating on and between the water surface, until such time as the water being introduced propagates further along the pipeline causing the further reduction of buoyancy and allowing the sinking to continue until the entire pipeline rests upon the sea bed. During the sinking process, the portion of the pipeline from the last point touching the sea bed to the portion floating on the surface forms the approximate shape of an "S". During the sinking process the pipeline is subjected to bending stresses throughout the "S" which must be controlled by applying axial tension to the pipeline to limit the amount of curvature in the pipeline. Failure to minimize the bending stress in the pipeline by the application of axial tension will result in the buckling of the pipeline. The amount of tension applied is dependent upon the composition of the material the pipeline is manufactured of, the size of the pipeline, the underwater terrain, the depth of water, and the total net installation weight, that is the weight of the flooded pipeline submerged in water minus any auxiliary buoyancy vessels attached.

Pipelines with offset weighting approaching 100%, and laid in deep water may require enormous amounts of tension to be maintained during their sinking as a means of maintaining the pipeline curvature within the minimum-bending radius as specified by the manufacturer of the pipe. If the proper tension is not maintained throughout the sinking process serious damage to the pipeline will result. Generally, large tugboats or winches are employed to achieve these tension requirements.

Applying large amounts of axial tension, especially in the case of thin wall synthetic pipelines, may not be practical as the tension requirements may exceed the tensile strength of the pipeline composition. Applying great amounts of axial tension can invoke significant costs and is often not practical from an economical point of view.

The use of auxiliary buoyancy vessels, in the form of a continuous pipe or tube, attached to pipelines is well established. The method of filling containers with a substance possessing a relative density greater than or less than water, to achieve ballast weight or buoyancy, is also common knowledge. Prior art in this field, as shown by Lamy, U.S. Pat. No. 4,062,198, utilizes a ballast pipe of the same length as that of the pipeline being installed, attached to the pipeline as a means of achieving auxiliary buoyancy over a specific section of pipeline, in such a way as to allow a reduction in apparent weight for a specific section of the pipeline, while the pipeline is being installed by means of dragging the pipeline along the sea bed. Lamy, U.S. Pat. No. 4,052,862 relates to methods of installing steel pipelines across rivers or bodies of water and entails laying steel pipelines encased within another steel pipe as a means of facilitating the installation and protecting the pipeline from corrosion or damage. Lamy, U.S. Pat. No. 4,052,862 also describes a method of filling the annulus created between the two pipes with mediums of various relative densities as a means of protecting the pipeline from corrosive damage. Neither of the aforementioned methods considers the ballast weight considerations of pipelines manufactured from synthetic materials laid in deep waters. Lamy's U.S. Pat. No. 4,052,862 method would not be practical for synthetic pipelines, and in fact would result in damaging synthetic pipelines enclosed within a ridged container such as a steel pipe, having the annulus filled with a substance with a relative density greater than water, because of the hydrostatic head pressure exerted by the mixture around the synthetic pipe. The hydrostatic pressure exerted on synthetic pipelines surrounded by a mixture consisting of a substance with a relative density greater than water would cause compression of the internal synthetic pipeline resulting in damage to the pipe wall.

Prior art in this field, as shown by Conner, U.S. Pat. No. 3,467,013 relates to a method of transporting water great distances with the use of a membrane wall pipeline secured to the sea floor with mechanical anchors and does not concern itself with the methods of installing pipelines underwater. Conner makes reference to a longitudinally extending chamber, which appears to be a continuous tube,-the function of which is to provide a small amount of ballast weight to his system. Conner makes reference to the chamber being adapted to receive mud from the sea bed, but does not provide any supporting detail of how, or at what point, the mud would be placed within. Conner's reference to using mud as ballast does not offer any insight or advantage to someone skilled in the art of pipeline installation. None of the above methods make any allowance for the increase or decrease in the final offset weighting to be achieved at specific sections of the pipeline, nor do they solve the unique problems associated with the installation of synthetic pipelines in deep water.

BRIEF SUMMARY OF THE INVENTION

This invention is an improvement over existing methods and has many advantages over the traditional methods of installing and ballasting underwater pipelines. The invention is particularly well suited for pipelines manufactured from synthetic materials, such as HDPE, but the invention may also be applied to pipelines manufactured from metal or other compounds. Because synthetic pipelines lack the tensile and compressive strength commonly associated with iron alloy pipelines they are prone to become damaged during their installation. The risk of damage increases with the amount of ballast weight applied and the depth of water where the pipeline is to be installed. The invention allows the final ballast weight to be achieved after the pipeline, which has had its weight reduced to the minimum amount necessary for sinking purposes, has been positioned on the sea bed. After positioning the lightly weighted pipeline on the sea bed, the ballast tubes attached to the pipeline are filled, by injection or other means, with a mixture consisting of a substance which possesses a relative density that is greater than water. The invention also makes provisions for any ratio of final ballast weight to be applied to the pipeline after its final positioning on the sea bed, while still retaining the obvious benefits of low weight during the launch and sinking phases. The invention makes further provisions to allow for an increase or decrease of the amount of final ballast weight applied to specific sections along the length of the pipeline, by making changes to the diameter of the ballast tubes as required at the specific sections.

It is the purpose of this invention to allow the designers and installers of synthetic pipelines the ability to reduce the amount of axial tension required during the sinking process, by reducing the amount of weight affecting the pipeline during the sinking phase of the installation. The invention allows for any percentage of offset weighting to be achieved, while minimizing the axial tension requirements during the sinking phase. For example, a synthetic pipeline with a final offset weight requirement of 200% can be installed in much the same fashion as a synthetic pipeline with a final offset weight requirement of 5%. This method will also mitigate the risk of damage to the pipeline, which may be a consequence of insufficient axial tension applied during the sinking process.

It is also the purpose of this invention to reduce the weight of synthetic pipelines, which are prefabricated on shore, to assist with the launching of these pipelines into the water.

It is a further purpose of this invention to reduce the risk of damage to pipeline ballast systems with the elimination of the probable causes and effects of corrosion, that is, to use almost exclusively, synthetic materials which are largely unaffected by exposure to water, either fresh or salt.

Ultimately, the invention will allow the designers and installers of underwater pipelines an alternative installation method and will allow synthetic pipelines to be installed in situations that have previously been considered as impractical.

BRIEF DESCRIPTION OF THE DRAWINGS

The following descriptions with reference to the drawings are given as non-limiting examples and will enable the method of carrying the invention into effect to be better understood.

DETAILED DESCRIPTION OF THE PREFERRED EMBODIMENT

The embodiments described herein are examples and it would be possible to modify them, notably by the substitution of technical equivalents, without departing from the scope of the invention. The invention can be configured to accommodate any practical number of ballast tubes as required to suit the particular design of the pipeline final ballast weighting and is not limited to the numbers of ballast tubes shown on the drawings or described herein.

As stated, the main advantage of the invention is to allow the reduction of weight during the launching and sinking phases of the pipeline installation. This is especially critical for synthetic pipelines designed with offset weight requirements near to or exceeding 100% as well as for pipelines manufactured from metal or other compounds. The pipeline can be assembled from a floating platform or on land using known and proven techniques and then launched into the water from a floating platform or pulled off of the land and into the water. The pipeline is positioned on the sea bed, using known and proven techniques. The final ballast weight is achieved with the introduction of a ballast mixture, possessing a relative density greater than water, into the ballast tubes from one end, preferably the shore end of the ballast tubes, and the ballast mixture is allowed to fill the entire ballast tube to achieve the required amount of final ballast weight.

Figure 6:
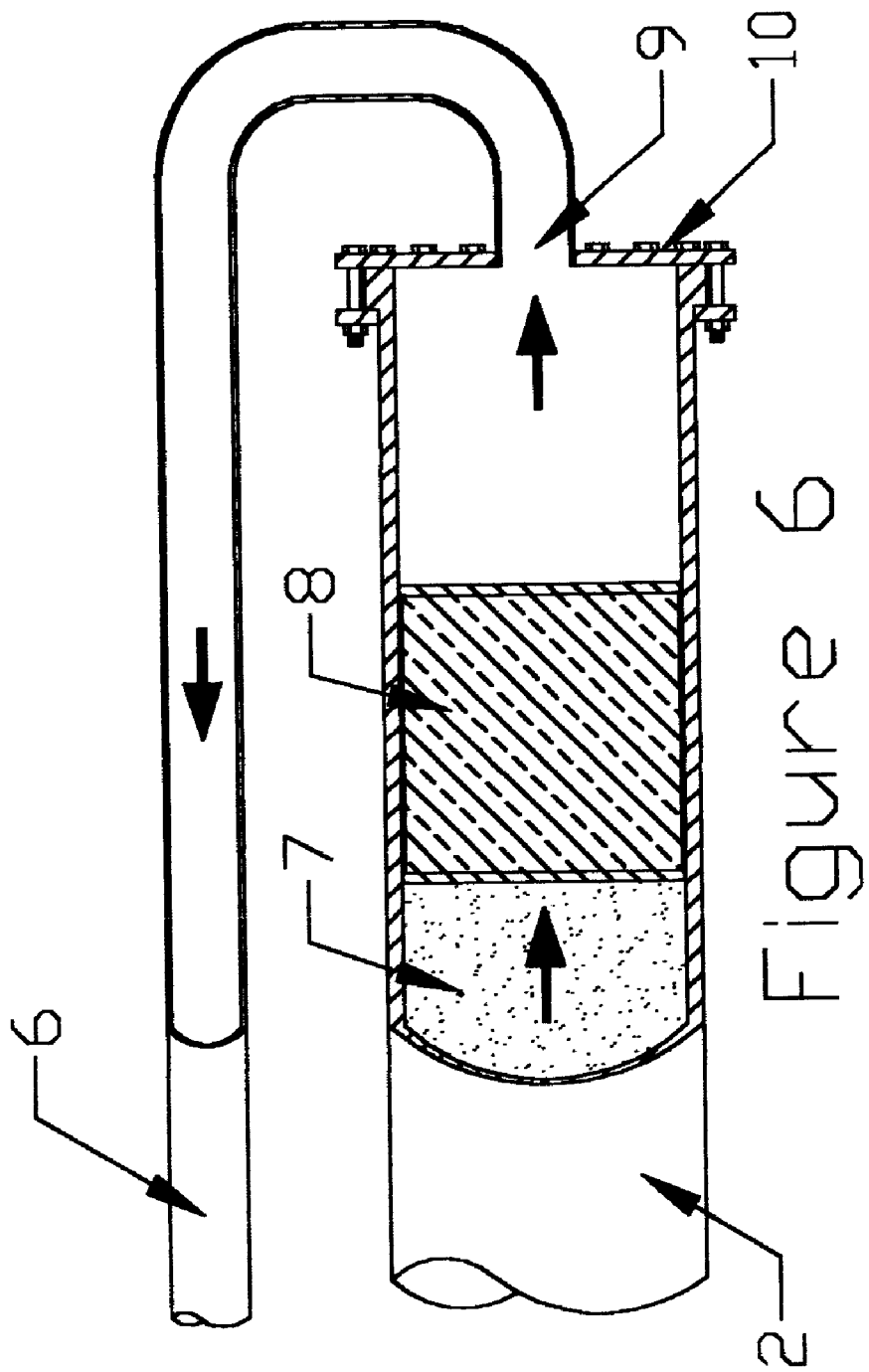
FIG. 6 is a cross sectional view of the end cap assembly of the ballast tube showing the flow of the ballast material and piston within the ballast tube. The arrows indicate the direction of travel of the ballast mixture, piston and flow of vented water.
Figure 7:
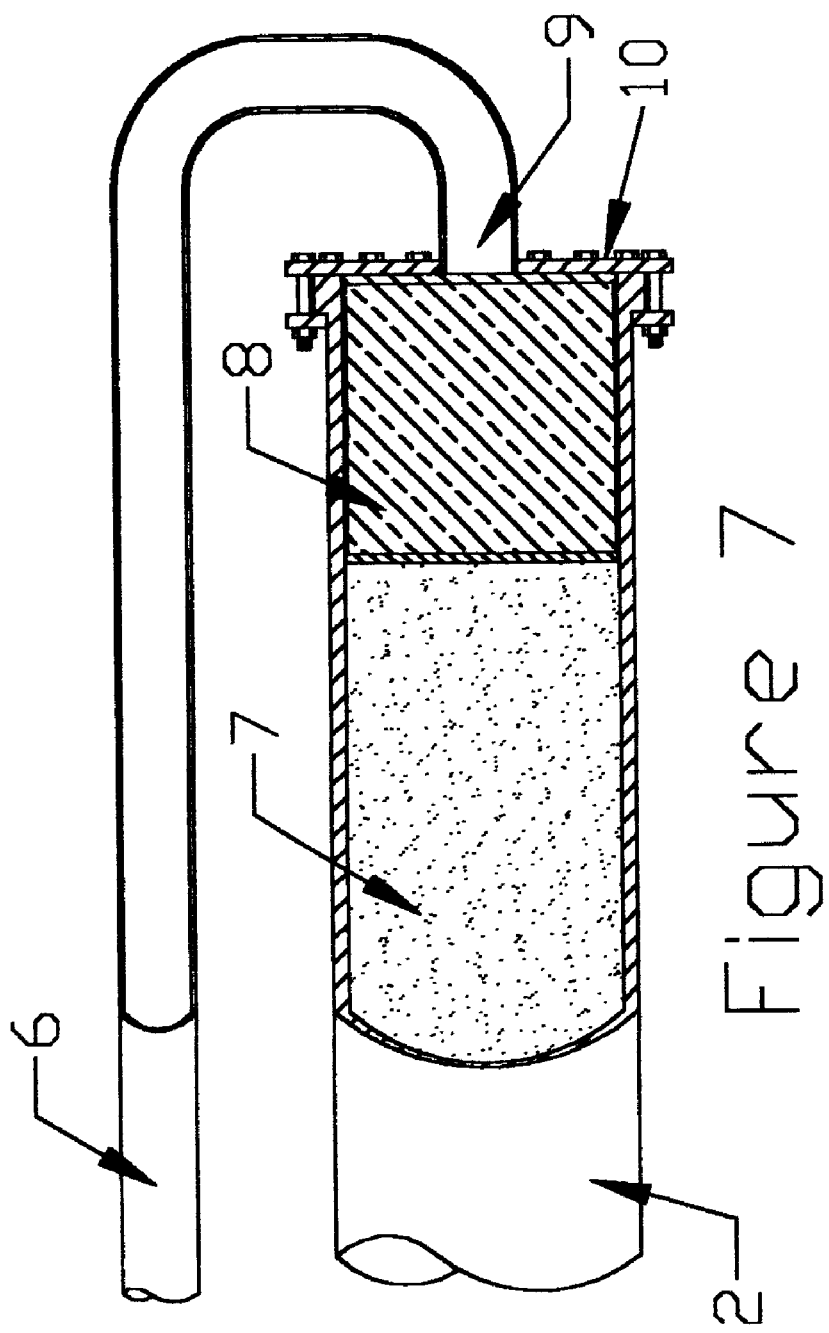
FIG. 7 is a cross sectional view of the end cap assembly of the ballast tube showing the position of the ballast mixture and piston at the extreme end of their travel.
Figure 8:
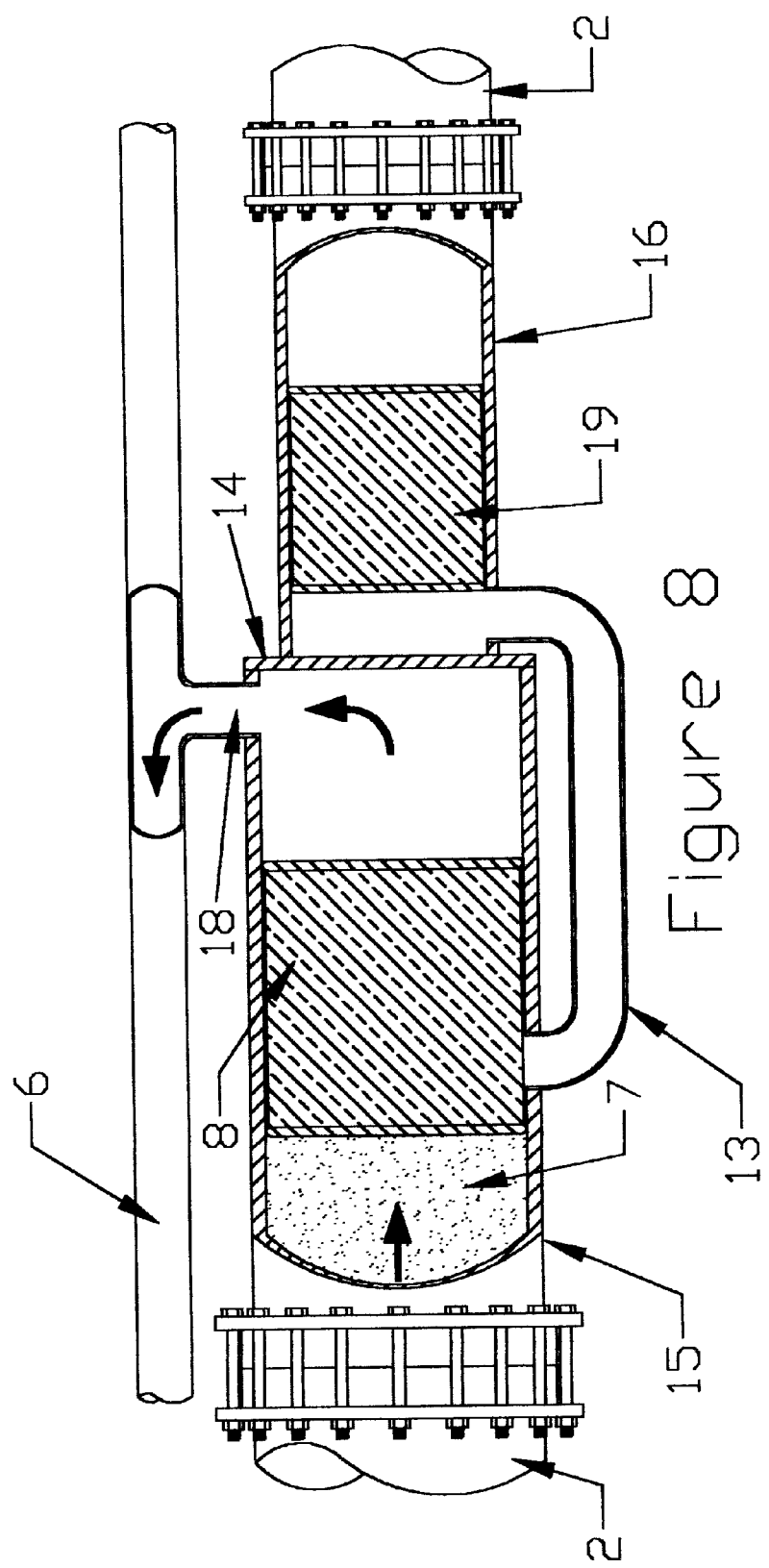
FIG. 8 is a cross sectional view of the ballast tube diameter transition adapter showing the flow of the ballast mixture into the primary chamber of the diameter transition adapter. The arrows indicate the direction of travel of the ballast mixture, piston and vented water.
Figure 9:
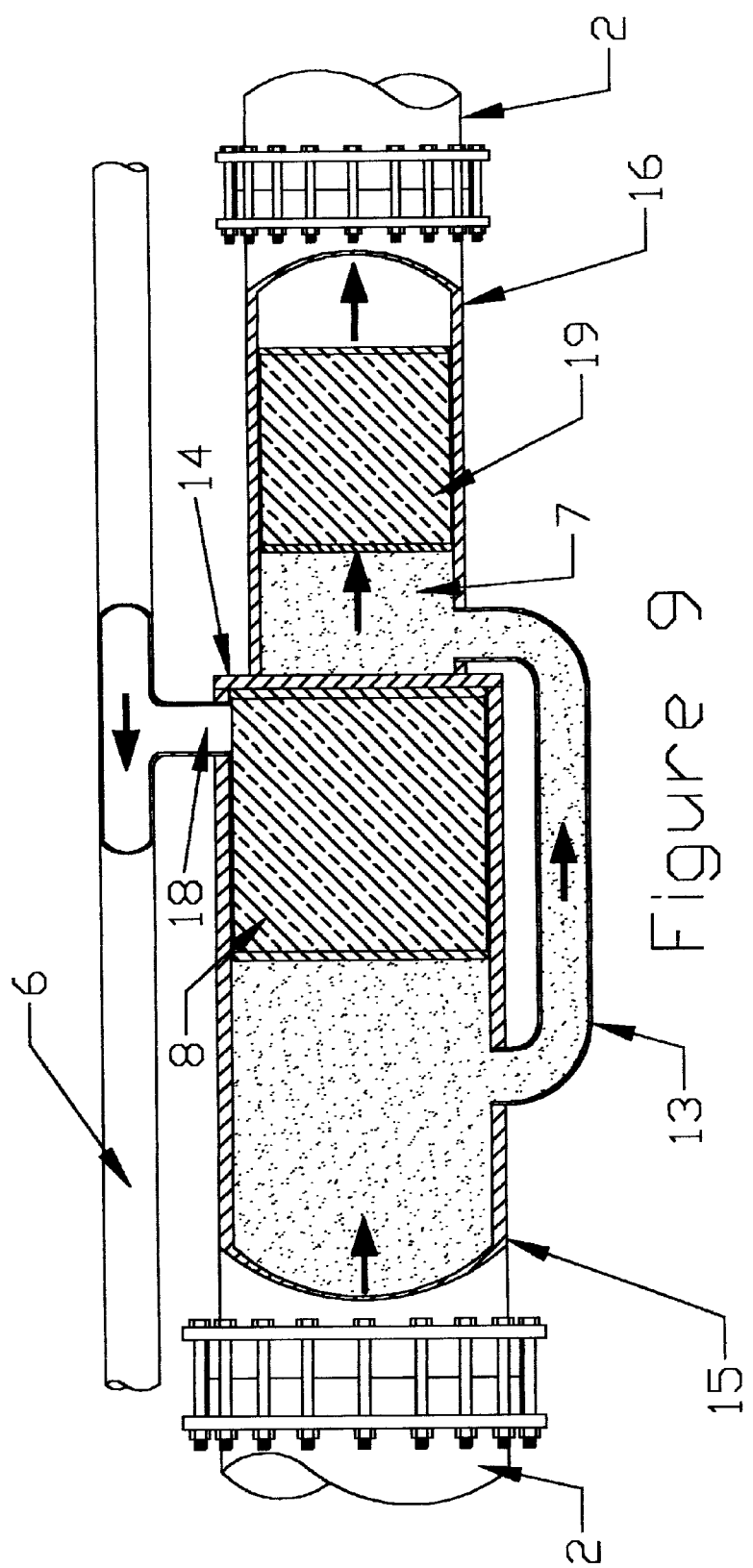
FIG. 9 is a cross sectional view of the ballast tube diameter transition adapter showing the flow of the ballast mixture from the primary chamber into the secondary chamber via the crossover pipe. The arrows indicate the direction of travel of the ballast mixture through the crossover pipe from the primary chamber to the secondary chamber, the direction of the travel of the piston located in the secondary chamber, and the direction of travel of the vented water.
Figure 10:
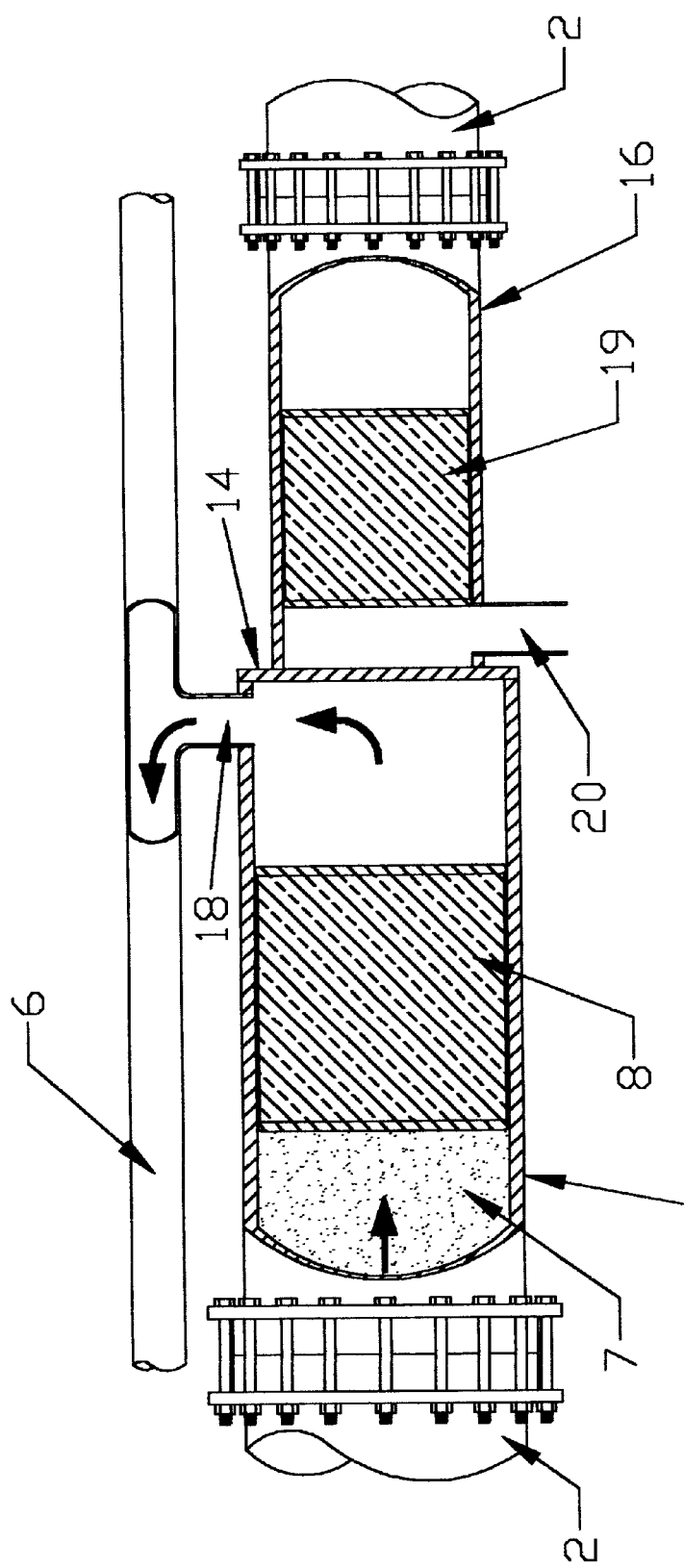
FIG. 10 is a cross sectional view of another version of the ballast tube diameter transition adapter showing the flow of the ballast material into the primary chamber of the diameter transition adapter. The arrows indicate the direction of travel of the ballast mixture, piston and vented water.

According to the invention, FIGS. 1 through 7 illustrate the embodiment of the invention when configured to provide a constant final offset weighting along the entire length of the pipeline. The constant final offset weighting can be of any percentage desired. FIGS. 8 and 9 reveal an example of the invention allowing for the final offset weighting to increase or decrease. FIG. 10 is another variation of the invention which allows for the final offset weight to increase or decrease.

Referring to FIGS. 1 through 7, the diameter of the ballast tubes remain at a constant internal diameter for their entire length. The pipeline 1 is assembled with the primary ballast weights 5, the ballast tubes 2, and the return line 6 encompassed together with the use of a band 3. The band is preferably manufactured from a synthetic fabric. The band encompasses the pipeline, ballast tubes, primary ballast weights and return line and is to be contained in a state of permanent tension with the use of a tensioning device 4 as shown.

The tensioning device 4 as shown in FIGS. 1 through 4 utilizes a threaded draw bolt to pull the ends of the band together and is preferably manufactured from an alloy such as stainless steel. It is also possible to permanently join the ends of the band 3 together after creating the proper tension by first drawing the ends of the band together with a means of applying tension, after drawing the ends together the fabric band can be stitched or riveted, or in the case of metal or synthetic bands, welding may be used. Suitable bonding agents may also be utilized as another means of permanently joining the ends of the band together. It is known that alloys referred to as stainless steel, which may become covered with organic sediments in a oxygen deficient area, can become corroded and loose their integrity. Therefore, the tensioning device 4, if used as the means of providing permanent tension to the band, is to be preferably positioned above the portion of the pipeline which is not touching the sea bed, as a means of isolating it from organic sediment which may cause corrosion. The said band, encircles the pipeline components and renders them in a fixed bundle, and is tensioned prior to the launch of the bundle into the water. Additional bands are applied as required between the areas which have the primary ballast weights installed, as a means of containing the ballast tubes closely to the pipeline.

The primary ballast weights 5, examples of which are shown in FIGS. 1 through 4 and FIGS. 12 and 13, are designed so that their shape lends to forming the pipeline components into a tightly contained bundle while not deforming the shape of the pipeline components while under tension. FIGS. 1 through 4 show the primary ballast weights 5 formed with a transverse indentation 17 around the outside of their perimeter as a means of capturing the band within the transverse indentation and assisting the band to remain orientated in the center of the primary ballast weights. The primary ballast weights 5 contain formed openings to accept the return lines 6. The primary ballast weights may be cast from concrete or any substance with a relative density greater than water.

The primary ballast weights are installed at regular intervals along the length of the pipeline, the spacing to provide the greatest economy within the bounds of practicality, that is the largest spacing between the primary ballast weights which does not cause undue stress to be formed because of the buoyant sections of the bundle forming humps between the primary ballast weights while the pipeline is floating on and between the water's surface or resting on the sea bed. The primary ballast weights provide just enough weight to overcome the buoyant effect caused by the difference in the relative density, which exists between the synthetic compounds which make up the bundle, that is the pipeline, ballast tubes and return line, and the water in which it is to be placed. The primary ballast weights being designed to exert any practical amount of sinking weight, which can be as low as 0.5 pounds of weight per lineal foot of pipeline, for the purpose of sinking the said bundle to the sea bed with the minimum of stress transferred to the pipeline. As an added benefit, the orientation of the pipeline is maintained throughout the launching and sinking phase due to the design of the primary ballast weights. The primary ballast weights have their greatest mass below the center of buoyancy of the pipeline bundle. Pipelines designed to have intake or diffuser ports protruding from the top portion of the pipeline must retain their orientation when positioned on the sea bed. The design and method of attachment of the primary weights in this way assures that the bundle is properly orientated when it comes to rest on the sea bed.

Figure 12:
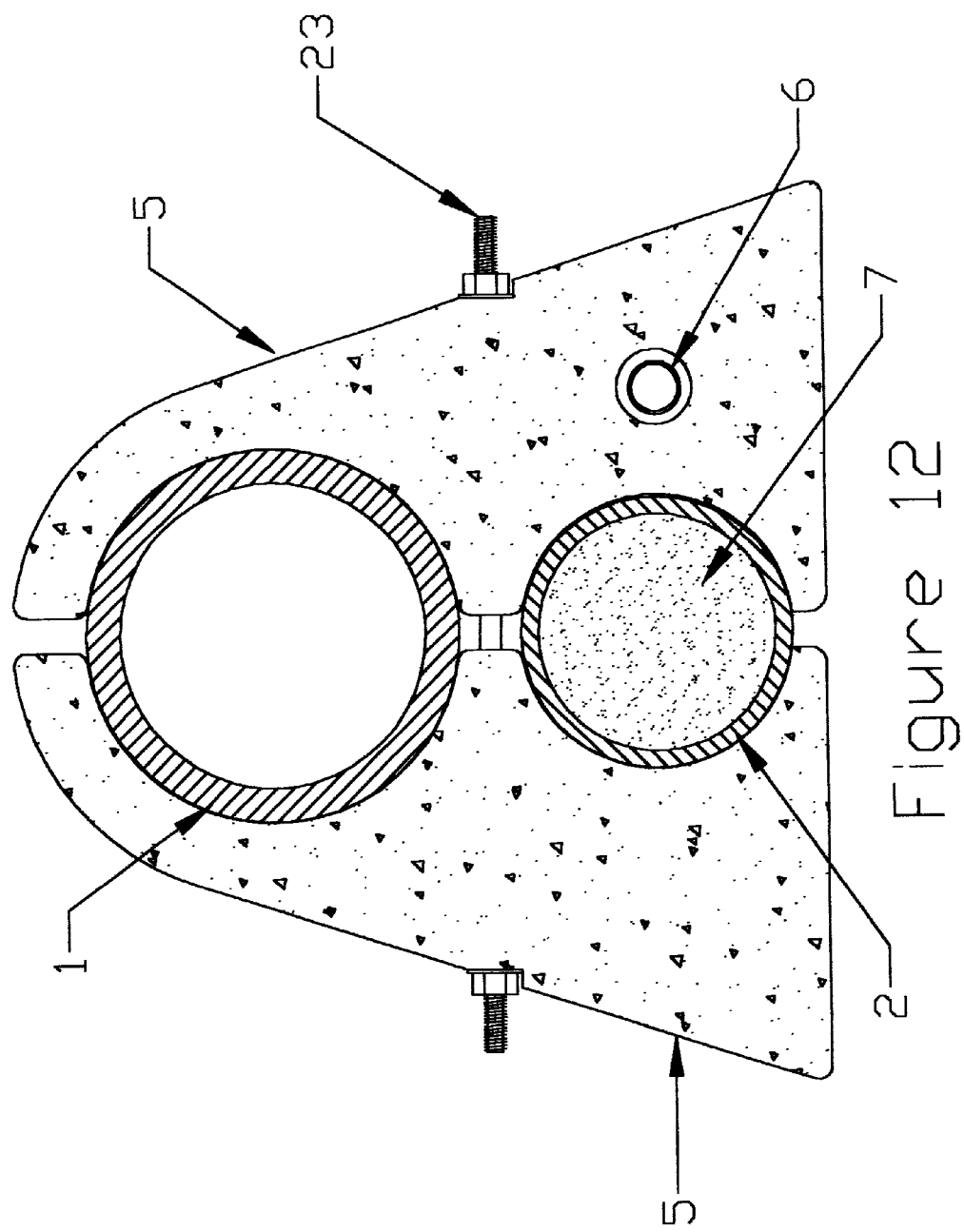
FIG. 12 is a cross sectional transverse view of a variation of the embodiment of the invention utilizing a singular ballast tube and showing the pipeline bundle and components of the invention with the primary ballast weights fastened to the bundle with the use of a draw bolt.
Figure 13:
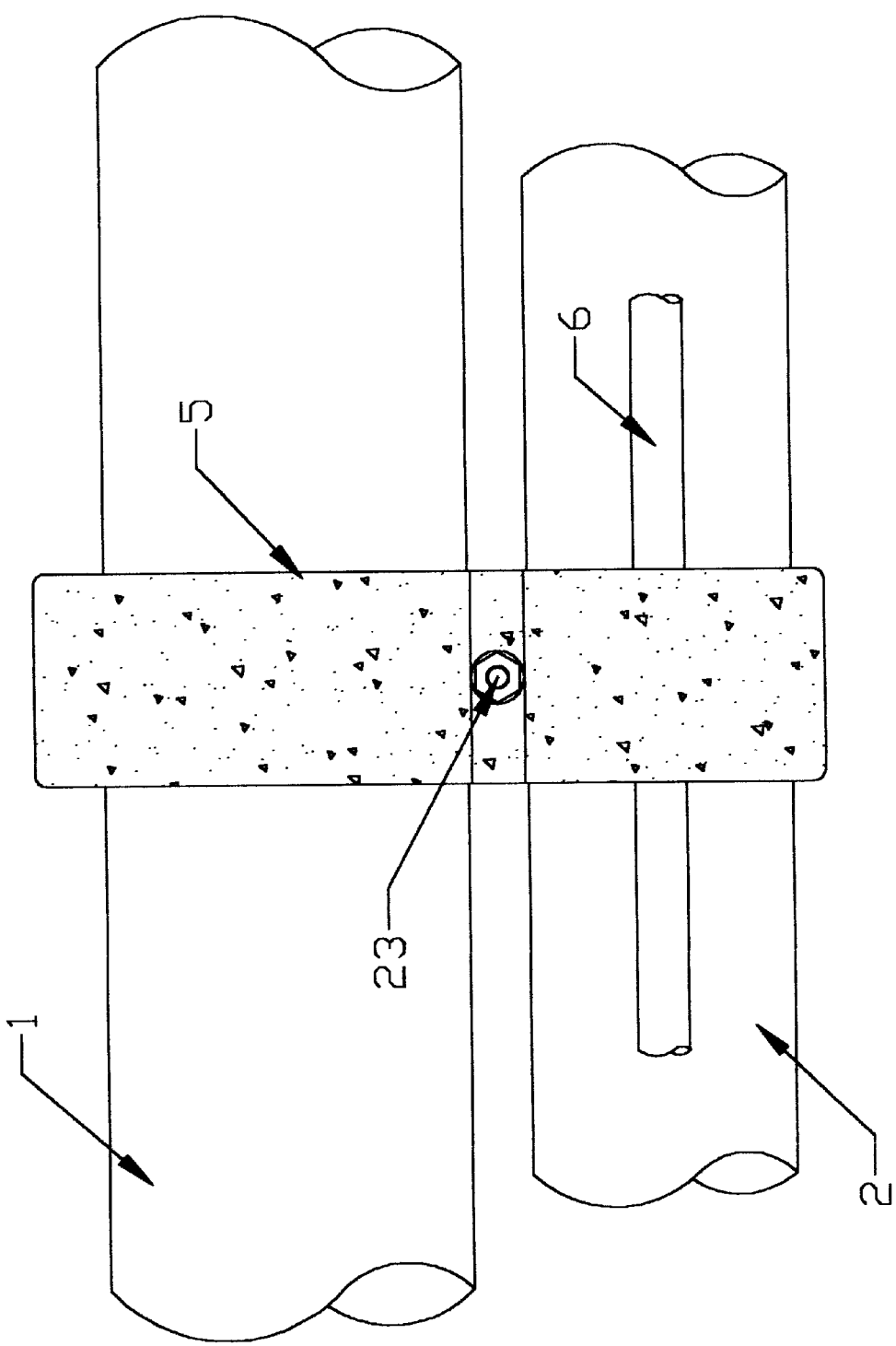
FIG. 13 is a side elevation view of a variation of the embodiment of the invention utilizing a singular ballast tube and draw bolt to fasten the primary ballast weights as described previously by FIG. 12.

The primary ballast weights may also be fastened to the pipeline and ballast tubes with the use of a draw bolt as shown in FIGS. 12 and 13. The draw bolt 23, preferably manufactured from a corrosion resistant alloy, is installed through holes cast into the primary ballast weights 5. This variation, of the means of containing the pipeline components in a fixed bundle, retains the benefit of properly orientating the pipeline on the sea bed.

It is possible that a pipe, synthetic or otherwise, may be produced with ballast tubes and conduits for the supply of the ballast mixture and venting of displaced water preformed around the pipe as an integral part of the pipe. Pipes such as this could be extruded or formed with integral singular or multiple ballast tubes and related supply and vent conduits of the proper diameter permanently affixed. Primary ballast weights as described above may be affixed to such specially manufactured pipe in the same manner.

Figure 1:
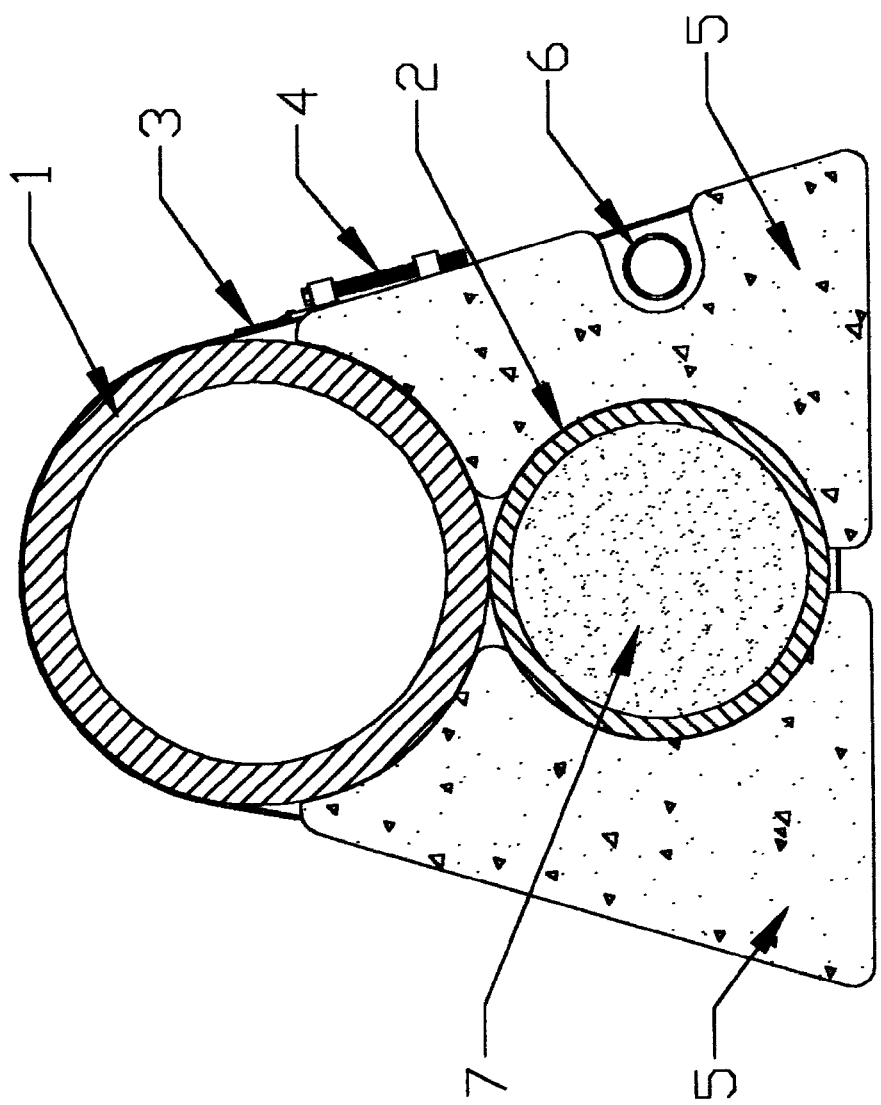
FIG. 1 is a cross sectional transverse view of an example of the embodiment of the invention utilizing a singular ballast tube and showing the pipeline bundle and components of the invention.
Figure 2:
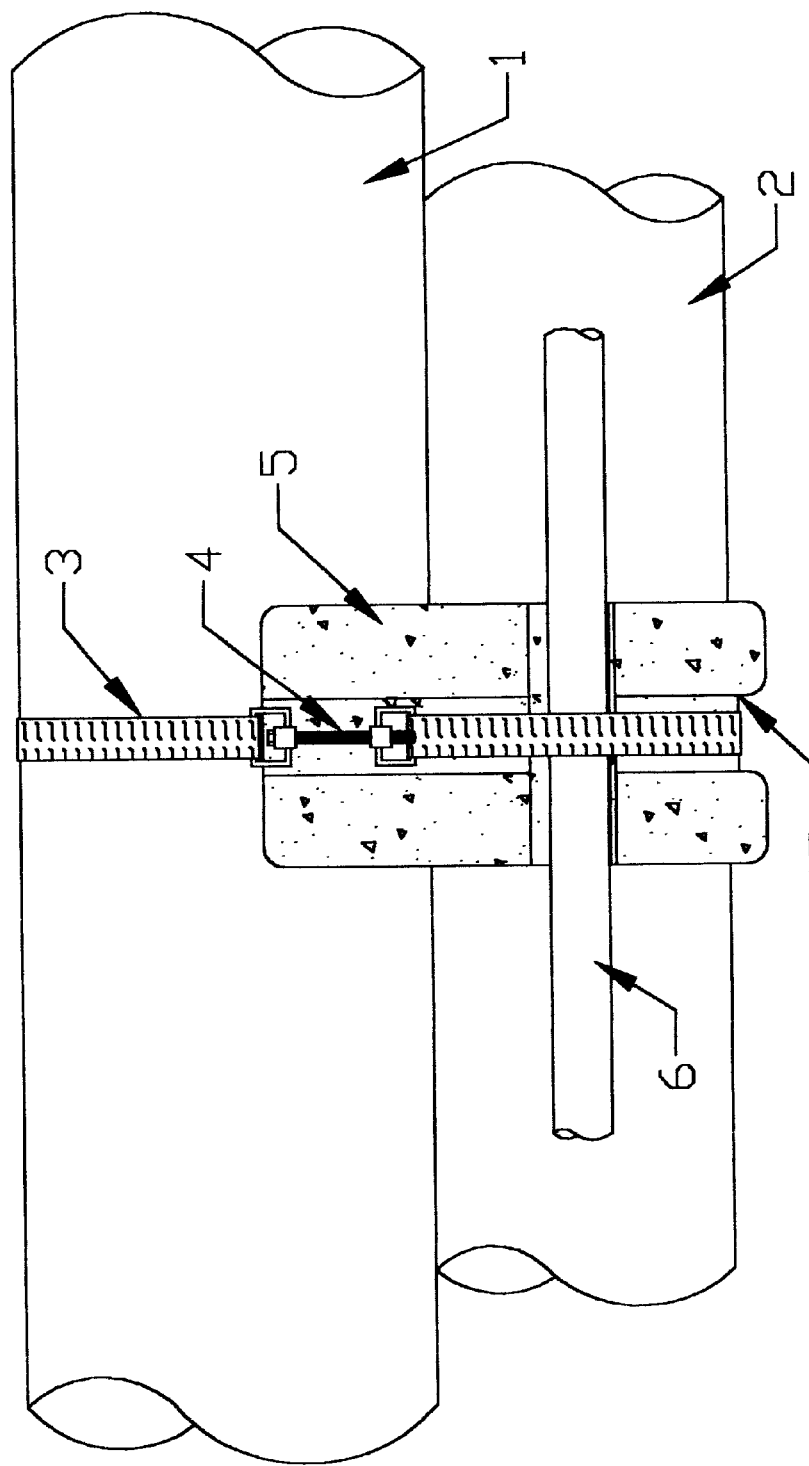
FIG. 2 is a side elevation view of an example of the embodiment of the invention utilizing a singular ballast tube as described previously by FIG. 1.
Figure 3:
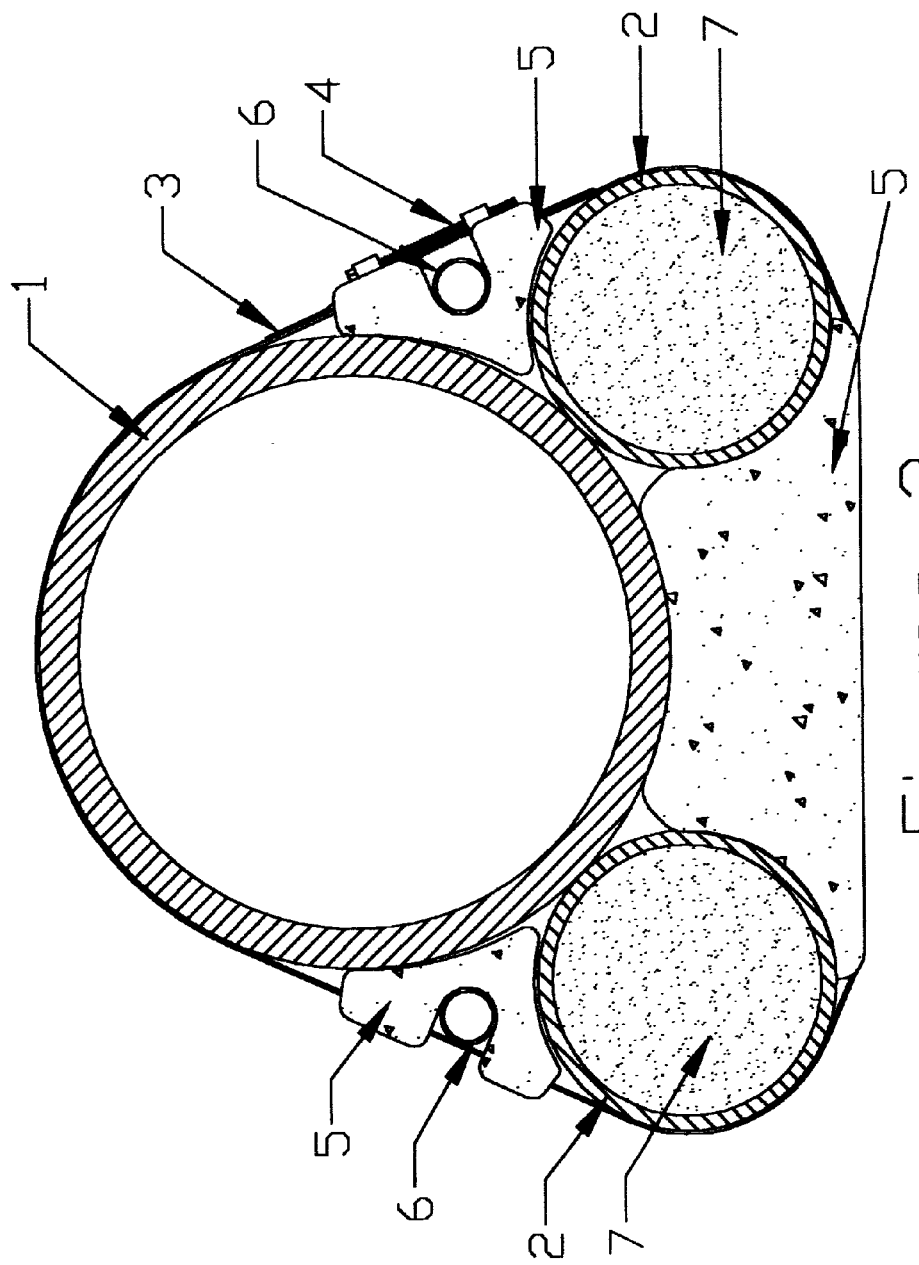
FIG. 3 is a cross sectional transverse view of an example of the embodiment of the invention utilizing multiple ballast tubes and showing the pipeline bundle and components of the invention
Figure 4:
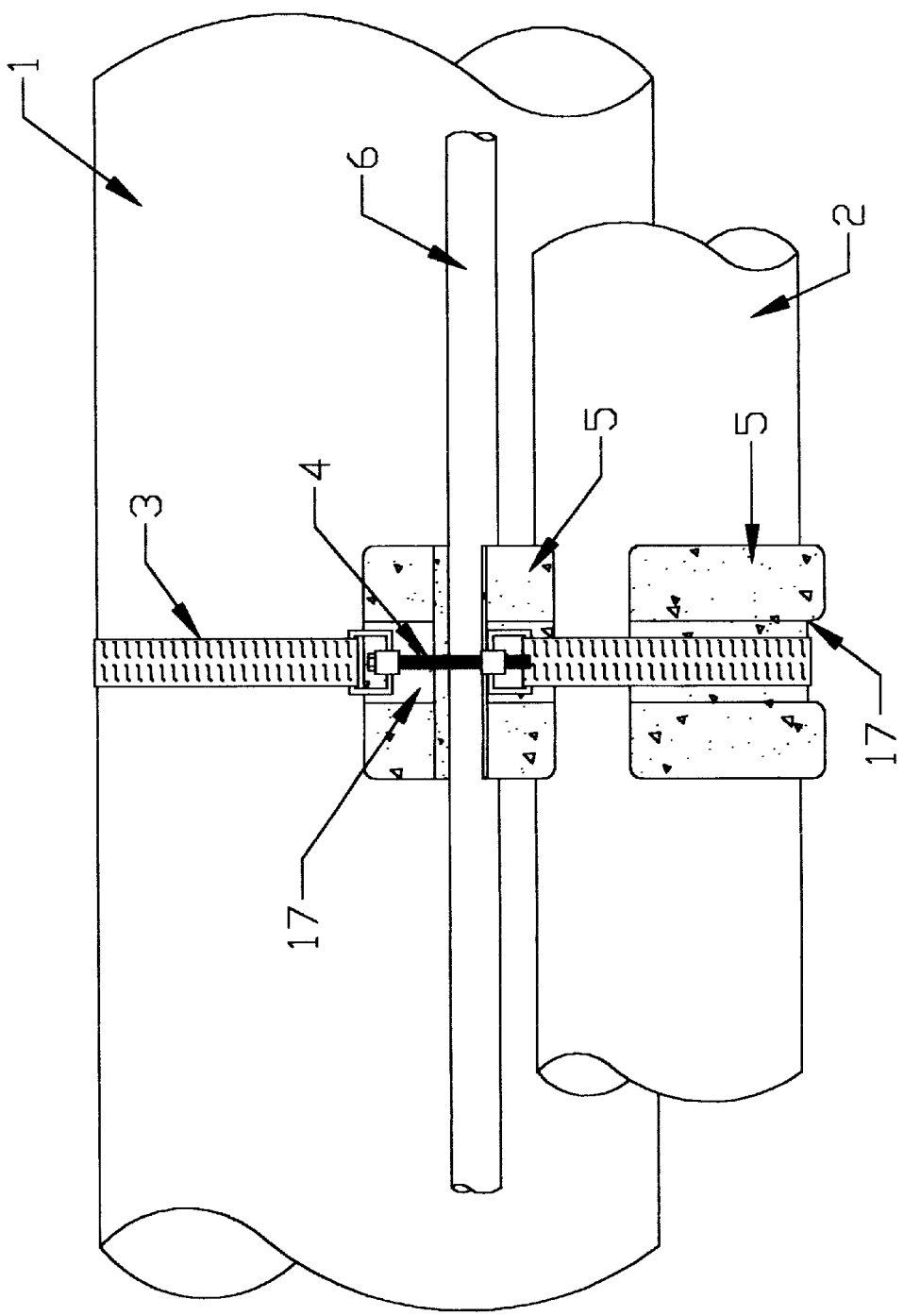
FIG. 4 is a side elevation view revealing an example of the embodiment of the invention utilizing multiple ballast tubes as previously described by FIG. 3.
Figure 5:
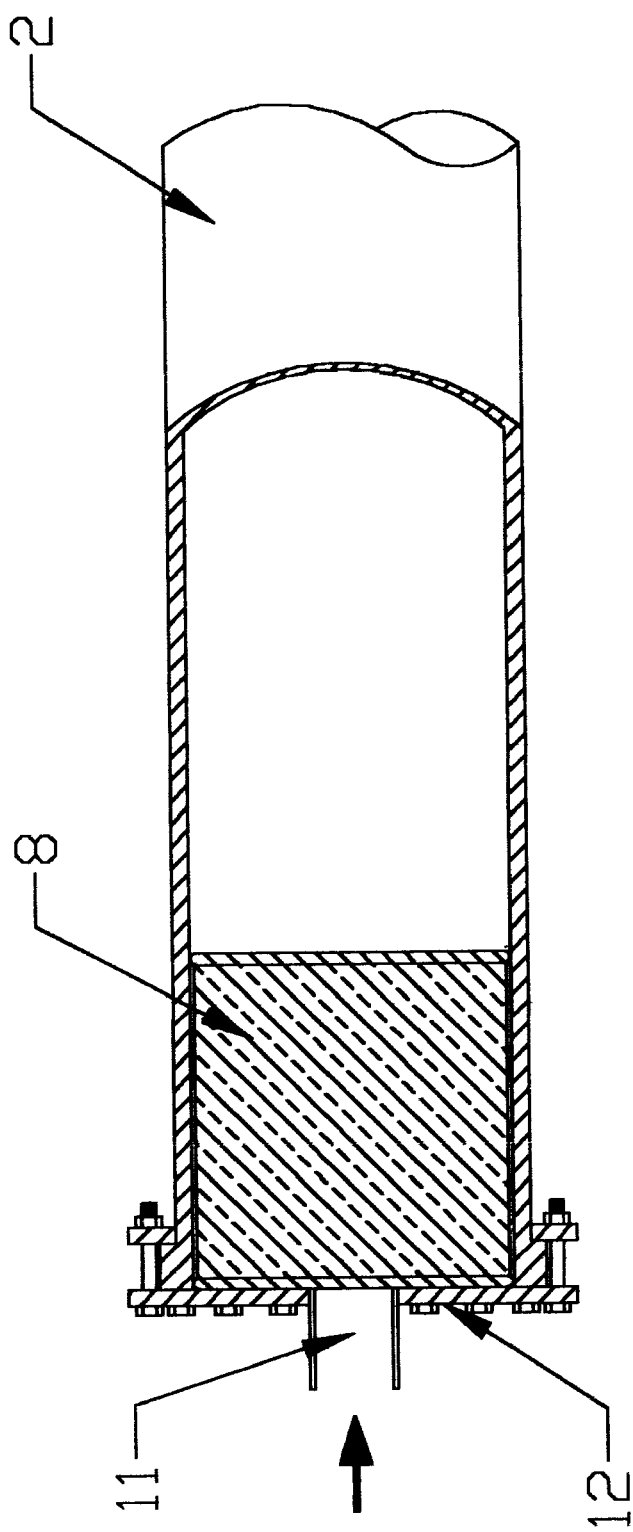
FIG. 5 is a cross sectional view of the supply cap assembly of the ballast tube showing the piston within the ballast tube. The arrow indicates the direction of travel of the ballast mixture when introduced.

The pipeline after being assembled with the aforementioned components and hermetically sealed, with a provision to introduce water at one end, and the provision of being able to vent escaping air from the opposite end, is launched into the water to float upon its inherent buoyancy. The ballast tubes 2 having an end cap assembly, as shown in FIGS. 6 and 7, installed on the offshore end, that is the end furthest from the shore, and a supply cap assembly, as shown in FIG. 5, installed on the shore end, that is the end closest to the shore, are allowed to be completely filled with water during the launching of the pipeline bundle. The piston 8, as shown in FIGS. 5 through 11 being free to travel through the ballast tubes and acting as a means of keeping separate, the ballast mixture 7, and the water within the ballast tubes. The piston 8 being of a flexible non compressible material capable of making a seal between the wall of the ballast tube and the piston body and maintaining the seal while travelling ahead of the ballast mixture.

Both the supply cap assembly and end cap assembly are joined to the ballast tubes by means of a flange coupling, welding or other suitable means. After positioning the floating pipeline bundle on the water's surface, with the ballast tubes already flooded during the launching, the pipeline itself is flooded, using known methods such as "S" bend sinking, and the bundle is allowed to come to rest upon the sea bed.

Referring to FIGS. 1 through 7, the ballast tubes 2, being assembled to form a continuous conduit for the placement of the ballast mixture, are shown to provide a constant final offset weight and therefore are of a constant internal diameter throughout their entire length. The ballast tubes having a provision for the connection of a hose for the introduction of the ballast mixture at the supply cap assembly port 11, as shown in FIG. 5. The supply cap assembly, as shown in FIG. 5 comprising of a bulkhead 12 capable of containing the ballast mixture, said bulkhead fitted with a supply port 11. The supply port II is fitted with a valve as a means of throttling or shutting off the flow of ballast mixture and the valve is fitted with a coupling means to attach a flexible hose or pipe for the introduction of the ballast mixture.

The ballast mixture is introduced to the ballast tubes 2, through the supply port 11 located on the supply cap assembly as shown in FIG. 5: As the ballast mixture is introduced through the supply port 11 the piston 8 is pushed ahead of the ballast mixture, the piston forming a barrier between the ballast mixture and the water within the ballast tubes. The water is displaced through the vent port 9 on the end cap assembly as shown on FIG. 6.

The ballast mixture may contain additives to facilitate it's introduction, by pumping or other suitable means into the ballast tubes, and may contain additives to cause the ballast mixture to become solid, if so desired, after a suitable amount of time has elapsed. As the ballast mixture 7 is introduced as described above, the piston 8 travels ahead of the ballast mixture 7, through the entire length of the ballast tubes 2 displacing the water through the vent port 9 until such time as the piston 8 reaches the bulkhead 10 on the end cap assembly, shown in FIGS. 6 and 7, and the piston 8 makes a permanent seal against the bulkhead 10 effectively sealing the vent port 9.

The ballast mixture to be effective must have a relative density which is greater than the water in which the pipeline is to be installed, therefore the weight of the column of ballast mixture will exert a hydrostatic head pressure within the ballast tube. The hydrostatic head pressure exerted by the weight of the ballast mixture will be greatest at the lowest point of the ballast tube. The return line 6, as shown in FIGS. 1 through 4 and FIGS. 6 through 10, and previously mentioned, is provided as a means of equalizing the pressure differential realized by the hydrostatic head pressure exerted by the weight of the ballast mixture within the ballast tubes for pipelines terminating in exceptional depths of water.

The two ends of the ballast tubes, in most applications, will be at different elevations due to the nature of the sloping sea bed, thus the two ends of the ballast tubes will be exposed to different external ambient pressures with the ambient pressure increasing with depth. The higher of the two ends would generally, but not necessarily, be the point of introduction of the ballast mixture.

During the introduction of the ballast mixture, the weight of the column of ballast mixture, if unsupported, could move down the ballast tube in an uncontrolled manner causing a reduction in the internal pressure of the ballast tube above the column of ballast mixture. A reduction in the ballast tube internal pressure could cause the collapse of a synthetic ballast tube. The return line 6, connected to the vent port 9 at the end cap assembly and fitted with a throttling valve, would allow the pressure within the lower portion of the ballast tube to be adjusted to remain equal to or marginally less than the pressure exerted by the weight of the column of ballast mixture. Routing the return line so that its terminus is at the water's surface allows the throttling valve to be actuated without the need for divers or remotely operated mechanisms. Routing the return line to the surface has the added benefit of allowing the water, which is being displaced, to be monitored and measured.

Pipelines with synthetic ballast tubes installed in very shallow depths need not have the vent ports equipped with return lines, the water displaced from within the ballast tubes during the introduction of the ballast mixture can be vented directly into the water outside of the ballast tube through the vent ports 9. If return lines are not installed, as in shallow water installations, the vent ports 9 will have valves fitted to them which can be closed or throttled by divers, remote operated vehicles or other means of remotely actuating the throttling valves. Pipelines installed with ballast tubes manufactured from iron alloys may also not be equipped with return lines if the iron alloy ballast tube has sufficient wall thickness to withstand external pressures which exceed the internal pressure of the ballast tube.

According to the invention FIGS. 8, 9 and 10 illustrate the embodiment of the invention when configured to provide changing final offset weighting along the length of the pipeline. It has been previously mentioned that it is desirable to be able to increase or decrease the amount of final offset weighting applied to the pipeline in specific sections. It has also been mentioned that it may be desirable to have multiple areas of the pipeline with different final offset weighting. The invention makes provisions for changes in offset weighting by making allowances for this increase or decrease of the diameter of the ballast tubes with the use of diameter transition adapters which allows the diameter of the ballast tubes to increase or decrease while allowing the continuous flow of ballast mixture through the ballast tubes. Any number of final offset weight changes as desired can be accommodated. The diameter transition adapter, as shown in FIGS. 8 and 9, is installed between two different sizes of ballast tubes during the assembly of the pipeline bundle. While the drawings depict a larger diameter ballast tube being filled with ballast mixture, connected by means of a flange coupling, via a diameter transition adapter, to a ballast tube of a smaller diameter, it is obvious that the arrangement could be reversed and configured so that a smaller diameter ballast tube can be attached to one of a larger diameter. Furthermore, it is also obvious that any number of diameter transition adapters can be installed as required to achieve the specific final offset weight requirements for specific sections of the pipeline. FIGS. 8 and 9 reveal the diameter transition adapter comprised of two separate chambers, referred to as the primary chamber 15 and secondary chamber 16. The primary chamber 15 is designated as the chamber in which the flow of the ballast mixture is first to enter. Said chambers being separated by a bulkhead 14. The bulkhead 14 acting as a means of separating the chambers 15 and 16, and providing a stop for the piston 8 which is travelling ahead of the ballast mixture 7 and displacing the water out through the vent port 18. The piston 8, which has been pushed through the ballast tube 2, ahead of the ballast mixture 7, and into the primary chamber 15 comes to rest against the bulkhead 14. The vent port 18 in the primary chamber 15 is now blocked by the piston 8. The ballast mixture 7 is now forced to divert through the crossover pipe 13 and the flow of the ballast mixture 7 is allowed into the secondary chamber 16. The piston 19, of a different diameter but possessing the same properties of the piston 8, is acted upon by the flow of ballast mixture 7 entering the secondary chamber 16. The flow of ballast mixture 7 pushes the piston 19 ahead of it and into the next section of ballast tube, which is of a different diameter, and onwards until such time as the piston 19 meets with another diameter transition adapter or the end cap assembly as previously described and shown in FIGS. 6 and 7. The vent ports 18 as shown in FIGS. 8, 9, and 10 are shown being connected to and emptying into the return line 6 as a matter of economy in utilizing the existing return line which is already connected to the end cap assembly. Said return line 6, as previously mentioned is fitted with throttling valves at the water's surface. If the return line 6 is deleted, for applications of shallow depth as previously mentioned, the throttling valves can be installed directly to the vent ports 18 and operated by divers or actuated remotely from the surface.

Referring to FIG. 10, another variation of the diameter transition adapter is revealed whereas the flow of ballast mixture is not continuous from a sole introduction port. As with the previous example of a diameter transition adapter it incorporates the same features, the main difference being the lack of the crossover pipe between the primary and secondary chambers with the addition of a supply port 20. The supply port 20 is fitted with a throttling valve and coupling means for the attachment of a flexible hose or pipe as an introduction point for the ballast mixture into the secondary chamber 16. The introduction of ballast mixture into the secondary chamber 16 pushes the piston 19 ahead of the ballast mixture and into the next section of the ballast tube 2, whereas the ballast mixture and piston 19 travel through the ballast tube 2 until such time as they come to the end cap assembly or another diameter transition adapter. It may be desirable to install a dedicated supply conduit to the port 20 to dispense with the coupling of a flexible hose or pipe at this phase of the ballasting sequence. A dedicated supply conduit to supply the ballast mixture to port 20 would be incorporated into the pipeline bundle during the construction of the pipeline. This variation of the diameter transition adapter allows multiple sections of the ballast tubes to be filled with the ballast mixture simultaneously or sequentially.

Figure 11:
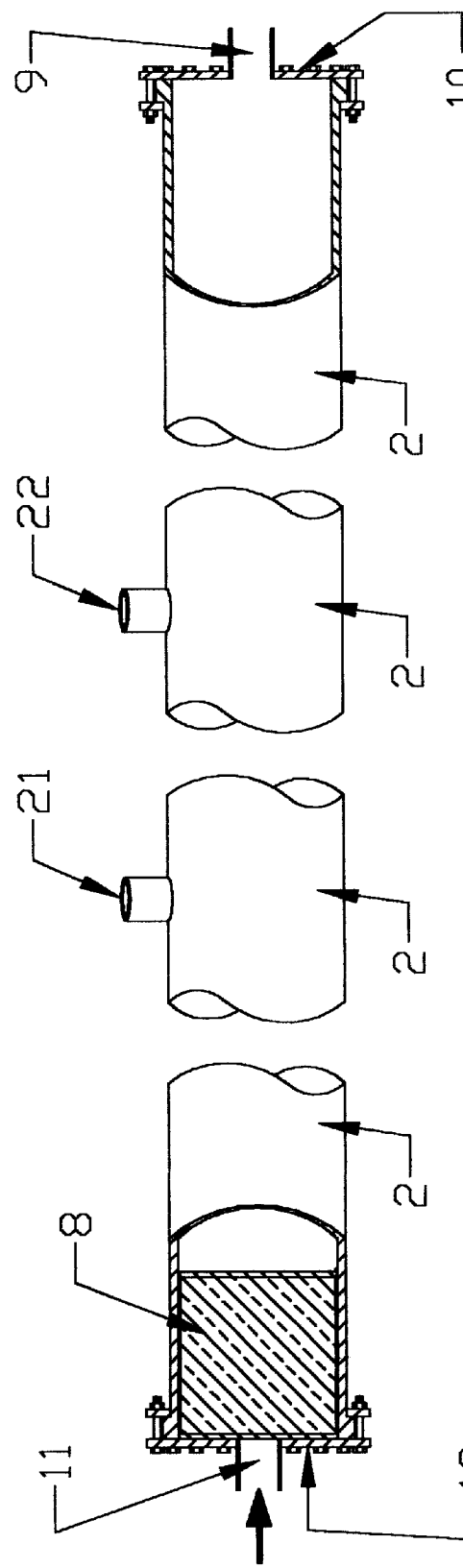
FIG. 11 is a cross sectional view of the method of sequential ballasting showing the supply cap assembly, series of dual purpose ports and end cap assembly. The arrow indicates the direction of travel of the ballast mixture when introduced.

Another variation of the invention, as shown in FIG. 11, is referred to as being a sequential variation and seeks to overcome the problems associated with pipelines of exceptional length. Pipelines of exceptional lengths may exceed the limitations of the ballast mixture to be injected throughout the entire length of the ballast tubes from a sole supply port due to the frictional impediment of the ballast mixture as it flows through the exceptional lengths of the ballast tubes. Sequential ballasting allows the minimally weighted pipeline to be assembled and positioned to the sea bed with the ballast tubes attached as previously outlined. The sequential method utilizes a supply cap assembly and an end cap assembly as shown in FIGS. 5 through 7. As shown in FIG. 11, the supply cap assembly is fitted to the end of the ballast tubes where the introduction of ballast mixture is to be initiated, and the end cap assembly is affixed to the opposite end of the ballast tube. The ballast tubes are fitted with a series of ports placed at intervals along the length of the ballast tubes. The ports are to be fitted with throttling valves and a coupling means for the connection to a flexible hose or pipe. The series of ports act as a means of filling the ballast tubes with ballast mixture as required as well as a means of venting water from the ballast tubes. As an example, consider the series of ports being given a system of number designations for the purpose of identification. In the example the first port downstream of the ballast mixture introduction point is referred to as port 21. Initially the ballast mixture is introduced at the supply port 11 on the supply cap assembly and the remaining ports in the ballast tubes, which are down stream of the flow of ballast mixture are left open to act as vents for the water displaced by the ballast mixture as it enters the ballast tube. When the ballast mixture pushes the piston 8 past the first port in the series, referred to as port 21, the introduction of the ballast mixture is temporarily halted and the valve at supply port 11 on the supply cap assembly is closed. A flexible hose, or pipe, is now connected to port 21 and the ballast mixture is now introduced into the ballast tube 2 at port 21. The flow of ballast mixture pushes the piston 8 past the next port in the series, referred to as port 22 and the flow of ballast mixture is again temporarily halted while the valve at port 21 is closed and the flexible hose, or pipe, is now connected to port 22 where the ballast mixture will now be introduced. The above steps being repeated until the section of the ballast tube 2 has been completely filled with the ballast mixture and the piston 8 is moved against the vent port 9 on the end cap assembly or the piston 8 encounters a diameter transition adapter.

Sequential ballasting, as outlined above, can also be utilized to add additional final ballast weighting to specific sections of pipelines in addition to other ballast weight already attached. This is accomplished by attaching a separate section of ballast tube, complete with a supply cap assembly and an end cap assembly as well as the series of multiple ports as described above, to the pipeline bundle as an additional weighting compliments The separate section of ballast tube is attached with the use of the banding means as previously described and may also incorporate all of the features of the return lines routed to the water's surface with throttling valves attached.

I claim:

1. An underwater pipeline installation apparatus comprising of; at least one ballast tube adapted to receive a ballast mixture and multiple primary ballast weights attached to the pipeline with multiple tensioned bands as a means of rendering said primary weights and said ballast tube and pipeline into a fixed bundle for the disposition to the bed of a body of water, whereas the introduction of a ballast mixture, possessing a relative density which is greater than that of the water in which the said pipeline bundle is placed, is introduced into at least one of the ballast tubes, said ballast tube having been adapted to receive such a ballast mixture by the installation of single or multiple ports, said ballast mixture to establish the final ballast weight of the pipeline by displacing the water within said ballast tube, whereas said ports to act as a means of introducing said ballast mixture and venting of displaced water from within said ballast tube, said ports to be equipped with valves as a means of throttling the flow of said ballast mixture and vented water, whereas said ballast mixture to be contained within the said ballast tube by the use of a supply cap and end cap assemblies, whereas said supply cap assemblies are fitted with at least one supply port as a means of introducing said ballast mixture, whereas said ballast mixture is kept from mixing with the water, within the ballast tubes, by means of a piston, inserted into the ballast tube for this purpose, said piston make a seal between the wall of the ballast tube and the piston body and maintaining the seal while traveling ahead of said ballast mixture within said ballast tube, whereas the final ballast weight can be increased or decreased by increasing or decreasing the internal diameter of the said ballast tube with the use of diameter transition adapters, whereas said diameter transition adapters comprise of a primary and secondary chamber, whereas said primary ballast weights having been designed and constructed to exert the minimal amount of weight sufficient to allow the said pipeline bundle to sink to the bed of the body of water.

2. An underwater pipeline installation apparatus as in claim 1 wherein the said ballast mixture is to be introduced into the ballast tube at a supply cap assembly, said supply cap assembly comprising of a bulkhead with a supply port affixed to said bulkhead, said bulkhead to act as a means of containing said ballast mixture, said supply port on said supply cap assembly to be fitted with a valve and coupling means for the attachment of a conduit for the introduction of the ballast mixture, said supply cap assembly to be fitted to the end of the ballast tube whereas the introduction of the ballast mixture is to initiate, said ballast mixture being allowed to fill the entire length of said ballast tube to the point of said ballast tube's termination.

3. An underwater pipeline installation apparatus as in claim 1 wherein the ballast mixture is kept separate from the water within the ballast tube by the use of a piston installed within said ballast tube, said piston forming a seal between the internal wall of said ballast tube and said piston body, said piston acting as a means to form a barrier between said ballast mixture and the water being displaced from within said ballast tube, said piston being free to travel ahead of said ballast mixture throughout the length of said ballast tube.

4. An underwater pipeline installation apparatus as in claim 1 whereas the terminus of said ballast tube is fitted with an end cap assembly as a means of containing and limiting the travel of said ballast mixture and said piston, said end cap assembly comprising of a bulkhead fitted with a vent port, said bulkhead to act as a means of containing said ballast mixture within said ballast tube, said vent port to allow venting means of the water which is displaced from within said ballast tube by said ballast mixture pushing said piston ahead of it within said ballast tube.

5. An underwater pipeline installation apparatus as in claim 4 whereas said piston acts as a means of automatically closing said vent port when said piston is placed in contact with the bulkhead and vent port on the said end cap assembly.

6. An underwater pipeline installation apparatus as in claim 4 whereas a valve is affixed directly to said vent port on said end cap assembly, said valve acting as a means of throttling the flow of water vented from said ballast tube during the instruction of said ballast mixture, the displaced water being discharged directly into the water surrounding the pipeline.

7. An underwater pipeline installation apparatus as in claim 6, wherein said valve is configured to be remotely operated from the surface.

8. An underwater pipeline installation apparatus as in claim 4 whereas a return line is connected to the vent port on the end cap assembly, said return line to be routed back to the surface of the water and to be fitted with a valve, said valve to act as a means to throttle the flow of water vented from the ballast tube during the introduction of the ballast mixture.

9. An underwater pipeline installation apparatus as in claim 1, whereas multiple ports are installed at locations along said ballast tube to act as a means of sequentially introducing said ballast mixture into said ballast tube, said multiple ports to act as a means of allowing the water within the ballast tube to be vented sequentially, said multiple ports to be fitted with valves as a means of throttling the vented water, said valves capable of making a watertight seal upon completion of the placement of the ballast mixture, said multiple ports to be fitted with coupling means for the attachment of a conduit for the introduction of said ballast mixture.

10. An underwater pipeline installation apparatus as in claim 9, whereas said valves on said multiple ports are configured to be remotely operated from the surface.

11. An underwater pipeline installation apparatus as in claim 1, whereas the final ballast weight can be increased or decreased for specific sections of the pipeline by increasing or decreasing the internal diameter of said ballast tube, the change of said ballast tube internal diameter corresponding to the specific sections of the pipeline where the deviation in the final ballast weighting is required, whereas the flow of said ballast mixture is introduced from a single port at said supply cap assembly of said ballast tube and flows in a continuous manner throughout the length of the said ballast tube, the continuous flow of said ballast mixture being achieved with the use of a singular diameter transition adapter for facilitating a single change of ballast tube diameter, whereas said diameter transition adapter comprises of a primary and secondary chamber separated by a bulkhead, said chamber to contain a port for venting displaced water directly into the surrounding water or routed back to the surface through a return line, said bulkhead to act as a means of containing the ballast mixture within said primary chamber and acting as a stop for the piston at the limit of said piston's travel within said primary chamber, said piston acting as a means of blocking the vent port on said primary chamber when said piston is at the limit of its travel in the primary chamber, whereas said primary chamber and secondary chamber to be connected with a crossover pipe as a means to divert the flow of said ballast mixture into said secondary chamber of said diameter transition adapter upon the arrival of said piston against said bulkhead, said secondary chamber to function as a means of a continuation of the ballast tube, said secondary chamber to contain a piston as a means of forming an effective barrier between said ballast mixture and the water being displaced from within the continuation of said ballast tube, said piston being free to travel ahead of said ballast mixture.

12. An underwater pipeline installation apparatus as in claim 1 whereas increasing or decreasing the internal diameter of the ballast tube is achieved with the use of multiple diameter transition adapters for facilitating multiple changes of ballast tube diameter, whereas said diameter transition adapters to be install in the specific locations of said ballast tube where the changing diameter of the ballast tube is desired to allow the increase or decrease of the final ballast weighting of the specific section of pipeline, whereas said diameter transition adapters to be joined between the ballast tubes of different diameters to allow for the continuous flow of ballast mixture to be introduced from said single supply port and to allow the ballast mixture to propagate through said ballast tubes to reach the said end cap assembly.

13. An underwater pipeline installation apparatus as in claim 12 whereas the water displaced through the vent port in the primary chamber of said diameter transition adapter is allowed to discharge into an existing return line, said existing return line having been provided to route displaced water from said end cap assembly to the water's surface, said return line fitted with said valve as a means for throttling the flow of displaced water, whereas said valves are configured to be operated manually or remotely from the surface.

14. An underwater pipeline installation apparatus as in claim 1 whereas a dedicated conduit is provided during the construction of the pipeline bundle to supply ballast mixture to the supply port located on said secondary chamber of said diameter transition adapter.

15. An underwater pipeline lion apparatus as in claim 1 whereas, said primary ballast weights are calculated to achieve the minimal amount of negative weight sufficient to overcome the buoyancy exerted due to the difference between the relative density of said pipeline bundle and that of the water in which it is placed, whereas said primary ballast weights to he formed with openings to accept the pipeline and ballast tube of the pipeline bundle, said primary ballast weights to be formed with concave depressions to accept the exact size and she of the pipeline and ballast tube as a means of containing the bundle under tension while limiting distortion of the pipeline and ballast tube, whereas said primary ballast weights to be formed with a transverse indentation formed along the center of the outside perimeter of said primary ballast weights as a means of assisting the tensioned band to reran orientated within the center of said primary ballast weights, whereas said ballast weights are attached beneath the center of buoyancy of said pipeline bundle as a means of maintaining the orientation of said pipeline bundle during the sinking of said pipeline bundle to the bed of the body of water.

16. An underwater pipeline installation apparatus as in claim 1 whereas the pipeline, primary ballast weights and ballast tube are contained in a fixed bundle by means of a tensioned hand, said band to be manufactured of a corrosion resistant material and to be maintain in a state of tension using a threaded fastener, said threaded fastener to be joined to the ends of the bands, said threaded fastener to function as a means of applying and maintaining tension.

17. An underwater pipeline installation apparatus as in claim 1 whereas the pipeline, primary ballast weights and ballast tube are contained in a fixed bundle by means of at least one threaded fastener, said threaded fastener situated transverse to said bundle and installed through the primary ballast weights in openings formed in said primary ballast weights for this purpose, said threaded fastener to contain said bundle in a permanent state of compression within said primary ballast weights, said ballast weights to be formed with concave depressions to accept the exact size and shape of the pipeline components as a means of containing the bundle under compression while limiting distortion of the pipeline ad ballast tube.

18. An underwater pipeline installation apparatus as in claim 1 whereas the pipe, which is used to form the pipeline, is manufactured with said ballast tube formed as an integral part of the pipe during the pipe manufacturing process at a factory or plant prior to the construction of the pipeline.

19. An underwater pipeline installation apparatus as in claim 1 whereas the pipe, which is used to form the pipeline, is manufactured with return lines formed as an integral part of the pipe during the pipe manufacturing process at a factory or plant prior to the construction of the pipeline.

20. An underwater pipeline installation apparatus as in claim 1 whereas the pipe which is used to form the pipeline is manufactured with conduits for the introduction of said ballast mixture formed as an integral part of the pipe during the pipe manufacturing process at a factory or plant prior to the construction of the pipeline.

* * * * *